United States Patent [19]

Arpin et al.

[11] 4,084,035

[45] Apr. 11, 1978

[54] SELF-ADHESIVE POLYESTER FILMS OF A COPOLYMER OF VINYL ACETATE AND MALEATE DIESTER

[75] Inventors: René Arpin, Lyon; Philippe Tissot, Miribel, both of France

[73] Assignee: Rhone-Poulenc Industries, Paris, France

[21] Appl. No.: 759,232

[22] Filed: Jan. 13, 1977

Related U.S. Application Data

[63] Continuation of Ser. No. 563,172, Mar. 28, 1975, abandoned.

[30] Foreign Application Priority Data

Mar. 29, 1974 France ................................ 74 11353

[51] Int. Cl.² ................................................ C09J 7/02

[52] U.S. Cl. .................................... 428/352; 428/353; 428/483; 428/447; 428/519; 428/448; 428/451; 428/458; 428/520; 260/27 R; 260/887; 260/888; 526/325; 526/279; 428/355

[58] Field of Search ............... 428/352, 353, 356, 483, 428/447, 448, 451, 458, 520, 519, 355; 260/78.5 R, 78.5 E, 27 R, 887, 888; 526/325

[56] References Cited

U.S. PATENT DOCUMENTS

| | | | |
|---|---|---|---|
| 3,330,720 | 7/1967 | Stevens et al. | 428/355 X |
| 3,690,937 | 9/1972 | Guse et al. | 428/355 X |

FOREIGN PATENT DOCUMENTS

| | | |
|---|---|---|
| 1,582,860 | 10/1969 | France. |

*Primary Examiner*—P. C. Ives

*Attorney, Agent, or Firm*—Cushman, Darby & Cushman

[57] ABSTRACT

Polyester films which are self-adhesive under pressure are provided, said films having, on one face thereof, an adhesive layer which comprises a copolymer of vinyl acetate and a maleate ester of an aliphatic alcohol having 4 to 10 carbon atoms. These films have the advantage that they can be rolled up and then unrolled without the adhesive layer becoming detached.

6 Claims, No Drawings

SELF-ADHESIVE POLYESTER FILMS OF A COPOLYMER OF VINYL ACETATE AND MALEATE DIESTER

This is a continuation of application Ser. No. 563,172, filed Mar. 28, 1975, now abandoned.

The present invention relates to polyester films which are self-adhesive under pressure.

Films which adhere under pressure, hereinafter referred to as "self-adhesive films", are being increasingly used in the packaging, labelling and electrical insulation industries as well as for decoration.

Generally, self-adhesive films consist, essentially, of a support film, one face of which can be covered with a non-stick layer and the other face with an adhesive layer which can, optionally, be bonded to the support film by an anchoring undercoat. The term "adhesive layer", as used herein, means a layer of product based on a synthetic polymer, which enables the adhesive film to adhere to a substrate by simply applying pressure thereto under cold conditions (ambient temperature).

There are several advantages which polyester support films possess, namely a very high tear strength, a high modulus, good rigidity, a wide range of use temperatures, good resistance to external agents and to aging and good dimensional stability.

Moreover, with self-adhesive films, it is important that the adhesive layer adheres more strongly to the support film than to any other surface against which the adhesive film is pressed, because the adhesive layer should not become separated from the support film, particularly when the film, usually in the form of a bobbin, is unwound before use.

It has been proposed, in British patent specification No. 1,187,716, to pre-treat the support film by grafting vinyl monomers. It is also well known, for example from British patent specification No. 1,059,139, to deposit on the support film an anchoring undercoat to increase the adhesion of the adhesive layer to the polyester support film.

According to the present invention, there are provided self-adhesive films comprising a saturated polyester support layer having, on one face thereof, an "adhesive layer" which comprises a copolymer of vinyl acetate and a maleate ester of an aliphatic alcohol having 4 to 10 carbon atoms.

Typically, any unstretched, mono- or bi-axially stretched or post-stretched film made of polyethylene glycol terephthalate can be used as the support layer.

The thickness of the films of the present invention suitably vary from 3.5 microns to 350 microns. It is, furthermore, possible to render the surface of the film metallic, or to print the film.

The other face of the support layer is generally a non-adhesive face and can be covered with a non-stick coating, for example based on silicone. In this instance, compositions comprising an organopolysiloxane polymer carrying SiH bonds, a catalyst and, optionally, an activator and a hydroxylic methylpolysiloxane polymer are generally used.

The copolymer forming the adhesive layer usually contains 40 to 65% by weight of vinyl acetate and 60 to 35% by weight of a maleate ester. The copolymer have preferably. a softening point of from 70° to 110° C. and a specific viscosity, measured at 20° C employing a 0.5% by weight solution in cyclohexanone, of from 35 to 65 ml/g. Copolymers of vinyl acetate and 2-ethylhexyl maleate are advantageously employed. The copolymers can be prepared from the monomers in a conventional manner.

The adhesive layer can also contain, for example 1 to 60% by weight, of one or more resins which provide "tack". By "tack", there is meant the ability of a glue to form a bond of measurable strength immediately after the glue and support have been brought into contact whilst applying slight pressure (see "Handbook of Adhesives" by I. Skeist).

Amongst these resins, colophony and its derivatives, especially its esters such as the methyl ester of dihydroabietyl phthalate, as well as polymers such as polyisobutene or elastomers such as styrene/butadiene copolymers, are generally used.

The adhesive layer can also contain, for example, pigments, dyestuffs, plasticisers, stabilisers and fillers.

The adhesive layer can be formed, for example from molten polymer or from a solution of it.

In the molten state, the adhesive is generally prepared by mixing, hot, the various adjuvants and then adding the copolymer with stirring. Stirring is continued until the mixture is perfectly homogeneous. The molten adhesive can be applied with equipment for extrusion-coating, lick coating or transfer roll coating.

Solutions of the adhesive can be prepared by dissolving, first, the copolymer and then the various adjuvants in a customary solvent. Examples of suitable solvents are: hydrocarbons, such as benzene, toluene, cyclohexane or hexane; any chlorinated solvents; ketones, such as acetone, methyl ethyl ketone, methyl isobutyl ketone or cyclohexanone; and esters, in particular methyl, ethyl, propyl or butyl acetate. Mixtures of these solvents, when they are compatible, are also suitable. Solutions of the adhesive suitably have a solids content of from 10 to 60% by weight.

The adhesive can be deposited, using conventional coating machines and processes, either directly onto the support layer or onto a temporary support followed by transfer onto the support layer. The amount of adhesive layer deposited on the support layer is usually from 10 to 50 g/m$^2$.

Generally two series of tests are carried out in order to determine the quality of the self-adhesive films.

The first series, based on AFERA (Association Fabricants Européens de rubans adhésifs; Association of European Manufacturers of Adhesive Tapes) Standard Specification 4001 P9, consists of measuring the linear adhesive power on various supports. A piece of adhesive film is applied to a standard plate or to a chosen support fixed in the jaw of a tensometer. The free end of the film is folded over through 180° and a tensile force is then exerted thereon by means of the jaw fixed to the measuring system. The adhesion is measured by the force necessary to detach the film from the plate or the chosen support. A pendular tensometer is used and the rate of travel of its moving jaw is adjusted to 500 mm/minute. The sample of film to be tested is pressed against the chosen supports by means of a polished cylindrical metal roller weighing 2 kg. The test is carried out on 1 cm wide samples of adhesive film.

The following substances are chosen as the support: the adhesive film on the side of the adhesive layer, the virgin support film (i.e. one which has not been rendered non-stick), and an aluminium plate and a copper plate, the surface properties of which correspond to AFERA Standard Specification No. 4001 P9.

The second series of tests, according to AFERA Standard Specification 4012 P1, consists of measuring the tangential adhesive power. It is possible to measure the force necessary to cause an adhesive tape, applied beforehand to a standard metal surface, to slip tangentially relative to the support surface, under well-defined experimental conditions. In practice, it suffices to measure the slip of a test piece of a particular size after a particular period of time: the piece of tape of width 12.5 mm and length 25 mm is pressed against a standardised metal plate. The other end of the tape is fixed to another metal plate of a particular weight, either 1 or 2 kg.

The adhesive tape, placed under the following conditions, is required;

1. to hold for 45 minutes at 20° C, under a weight of 2 kg (the "cold flow" test), and 2. to hold for 90 minutes at 50° C, under a weight of 1 kg (the "hot flow" test).

Slip over a distance of less than 2.5 mm is tolerated.

The two properties of adhesive power and resistance to flow usually vary in the opposite direction: the more the adhesive layer is plasticised and posseses "tack", the weaker is the resistance to flow. Conversely, an adhesive layer which is only slightly plasticised and possesses little "tack" will have a good resistance to flow.

A balance must be found between these two opposing properties, depending on the desired result and on the envisaged use. By varying the percentage of maleate ester in the copolymer and the nature and amount of the adjuvants which provide "tack" it is generally possible to obtain the desired result.

In addition to the properties of the adhesive layer indicated above, there are also the advantages described above arising from the use of the polyethylene glycol terephthalate film, as well as the ease of depositing the adhesive layer which usually does not require any anchoring undercoat.

The present invention is further illustrated by the following Examples in which parts and percentages are by weight.

EXAMPLE 1

A solution containing the following constituents is prepared:

91 parts of 50/50 vinyl acetate/ethyl hexyl maleate copolymer, having a softening point of approximately 85° C, a specific viscosity of 50 ml/g in the form of a 0.5% solution in cyclohexanone at 20° C, and a melt viscosity of 150 Po at 200° C, 9 parts of a methyl ester of colophony, having a boiling point of 352°–356° C, a refractive index at 20° C of 1.53, and a Gardner-Holdt viscosity at 25° C: Z—$Z_3$, 100 parts of hexane and 200 parts of acetone.

Using a laboratory coating machine equipped with a "reverse roll" system, a polyethylene glycol terephthalate film of thickness 23 microns and width 35 cm is coated at the rate of 5 m/minute. The coated film passes through an oven of length 2 m at 120° C.

A uniform deposit of adhesive mass of 21 g/m$^2$ is obtained.

The tests indicated above are carried out: Adhesion of the coated face to the coated face: force necessary for separation: 670 g. No splitting into layers or detachment of the adhesive layer from the support film is observed.

Adhesion of the coated face to the non-coated face: force for separation: 880 g. No trace of residue of the adhesive layer on the support film is observed. Adhesion of the coated face to metals: aluminium-copper, force for separation 230 and 490 g. No residue is observed on the metal.

The cold flow and hot flow tests conform to the standard specifications indicated above.

EXAMPLE 2

A solution containing the following constituents is prepared:

91 parts of copolymer as in Example 1, 9 parts of a dihydroabietyl phthalate, having a softening point (Hercules Drop method) of 60°–70° C, a saponification number of 129 and an acid number of 10, 200 parts of acetone and 100 parts of toluene.

A polyethylene glycol terephthalate film of width 35 cm and thickness 23 microns is coated with this adhesive mass, as indicated in Example 1.

After drying, a deposit of 22 g/m$^2$ is produced.

The cold flow and hot flow tests conform to the standard specifications indicated above.

The linear adhesive power is also measured and the following results are obtained:

Adhesion of the coated face to the coated face: force necessary for separation: 400 g. No splitting into layers or detachment of the adhesive layer from the support film is observed.

Adhesion of the coated face to the non-coated face: force for separation: 50 g. There is no residue of the adhesive layer on the support film.

Adhesion of the coated face to metals: aluminium: force for separation: 150 g. There is no residue of the adhesive layer on the metal.

We claim:

1. A self-adhesive film comprising a support layer in the form of a film of a saturated polyester having, on one face thereof, an adhesive layer which comprises a copolymer of vinyl acetate and a maleate diester of an aliphatic alcohol having 4 to 10 carbon atoms, said copolymer containing 40 to 65% by weight of vinyl acetate units and, correspondingly, 60 to 35% by weight of units of the maleate diester and having a softening point of from 70° to 110° C. and a specific viscosity, measured at 20° C. on a 0.5% by weight solution in cyclohexanone, of from 35 to 65 ml/g.

2. A self-adhesive film according to claim 1, wherein the adhesive layer also contains a tackifying agent selected from an elastomer consisting of styrene/butadiene, a colophony resin and polyisobutene.

3. A self-adhesive film according to claim 2, wherein the adhesive layer comprises 40 to 99% by weight of the copolymer and 1 to 60% by weight of the elastomer and/or the said resin.

4. A self-adhesive film according to claim 1, wherein the support layer is of polyethylene glycol terephthalate.

5. A self-adhesive film according to claim 1, wherein the maleate ester is 2-ethyl-hexyl maleate.

6. A self-adhesive film according to claim 1, wherein the other face of the support layer is covered with a non-stick silicone coating.

* * * * *